US012325363B2

(12) United States Patent
Vroman

(10) Patent No.: US 12,325,363 B2
(45) Date of Patent: Jun. 10, 2025

(54) MAGNETIC MIC MOUNT DEVICE

(71) Applicant: Steven Vroman, Titusville, PA (US)

(72) Inventor: Steven Vroman, Titusville, PA (US)

( * ) Notice: Subject to any disclaimer, the term of this patent is extended or adjusted under 35 U.S.C. 154(b) by 245 days.

(21) Appl. No.: 18/329,799

(22) Filed: Jun. 6, 2023

(65) Prior Publication Data

US 2023/0391274 A1 Dec. 7, 2023

Related U.S. Application Data

(60) Provisional application No. 63/349,209, filed on Jun. 6, 2022.

(51) Int. Cl.
*H04R 1/08* (2006.01)
*B60R 11/02* (2006.01)
*F16M 11/14* (2006.01)
*H01F 7/02* (2006.01)

(52) U.S. Cl.
CPC ......... *B60R 11/0247* (2013.01); *F16M 11/14* (2013.01); *H01F 7/0252* (2013.01); *H04R 1/083* (2013.01); *H04R 2499/13* (2013.01)

(58) Field of Classification Search
CPC .... H04R 1/08; H04R 1/083; H04R 2201/021; H04R 2201/023; H04R 2499/13; A45F 5/1516; H04M 1/04; B60R 11/0247; F16M 11/14
See application file for complete search history.

(56) References Cited

U.S. PATENT DOCUMENTS

| | | | |
|---|---|---|---|
| 4,287,676 A | 9/1981 | Weinhas | |
| 6,491,194 B2 | 12/2002 | Marvin | |
| 6,919,787 B1 | 7/2005 | Macken | |
| D551,058 S | 9/2007 | Carnevali | |
| 10,505,392 B2 | 12/2019 | McSweyn | |
| 2016/0259374 A1 | 9/2016 | Breiwa | |
| 2016/0286294 A1* | 9/2016 | Schreiber | F16M 13/02 |

* cited by examiner

*Primary Examiner* — Kile O Blair
(74) *Attorney, Agent, or Firm* — Brennan, Manna & Diamond, LLC

(57) ABSTRACT

A magnetic mic mount device is disclosed for a CB radio microphone. The magnetic mic mount device comprises an adjustable magnetic clip component that will hook to a CB radio microphone, or be permanently attached thereto. Once the user has hooked the device to his or her microphone, the user may hang it up on his or her CB radio. The adjustable magnetic clip component comprises a short arm component with a plastic ball and nut that is adjustable and an attached magnet component. Accordingly, the plastic ball and nut allow the attached magnet component to be positioned in a desired location.

20 Claims, 3 Drawing Sheets

MAGNETIC MIC MOUNT DEVICE

CROSS-REFERENCE TO RELATED APPLICATION

The present application claims priority to, and the benefit of, U.S. Provisional Application No. 63/349,209, which was filed on Jun. 6, 2022, and is incorporated herein by reference in its entirety.

FIELD OF THE INVENTION

The present invention relates generally to the field of magnetic mic mount devices. More specifically, the present invention relates to a magnetic microphone mount for a CB or police radio. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in magnetic mic mount devices. Generally, most microphone mounts comprise a small, two-prong metal clip which the knob on the back of the mic slides into. Specifically, the clip assembly typically includes a tongue supported by a post, wherein the tongue and the post are slidably received within a groove and slot of a holder to provide a mechanical coupling therebetween. Further, the mechanical clip assembly is used for mounting to a support, such as an interior surface within a vehicle.

Accordingly, such conventional mounting systems often require precise positioning of the microphone relative to the holder for coupling thereto, a task that may prove difficult in a moving vehicle. Furthermore, linking up the microphone to the clip while driving presents distraction and possible accidents.

Accordingly, there is a demand for an improved magnetic mic mount device that allows a CB radio mic to be magnetically retained on the CB radio or other metallic surface. More particularly, there is a demand for a magnetic mic mount that allows the microphone to be easily secured to the CB radio without distracting the driver.

Therefore, there exists a long-felt need in the art for a magnetic mic mount device that provides users with a magnetic microphone mount for a CB radio. There is also a long-felt need in the art for a magnetic mic mount device that features an adjustable and flexible design for ease of use and access to the microphone. Further, there is a long-felt need in the art for a magnetic mic mount device that allows drivers to stay focused on the road when returning and picking up a CB radio microphone to its holder. Moreover, there is a long-felt need in the art for a device that enhances safety by reducing distracted driving. Further, there is a long-felt need in the art for a magnetic mic mount device that accommodates truck drivers, public transportation workers, emergency personnel, and anyone who uses a CB radio while traveling. Finally, there is a long-felt need in the art for a magnetic mic mount device that can be secured to any suitable metal base.

The subject matter disclosed and claimed herein, in one embodiment thereof, comprises a magnetic mic mount device. The device is a magnetic mount for a CB radio microphone. The magnetic mic mount device comprises an adjustable magnetic clip component that will hook to a CB radio microphone, or alternatively may be molded to the back of the microphone directly from the microphone manufacturer. Once the user has hooked the device to his or her microphone, the user may hang it up on his or her CB radio. The adjustable magnetic clip component slides onto the back of a mobile microphone of the CB radio. The adjustable magnetic clip component comprises a short arm component with a plastic ball and nut that is adjustable and an attached magnet component. Accordingly, the plastic ball and nut allow the attached magnet component to be positioned in a desired location. Thus, when the device is used on a mobile microphone, it can be easily hung up on any suitable metal base.

In this manner, the magnetic mic mount device of the present invention accomplishes all of the foregoing objectives and provides users with a device that magnetically secures a microphone for a CB radio to a metallic surface. The device is an adjustable magnetic clip that allows the magnet to be positioned in a desired location. The device can be manufactured of a plastic material.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a magnetic mic mount device. The device is a magnetic mount for a CB radio microphone. The magnetic mic mount device comprises an adjustable magnetic clip component that will hook to a CB radio microphone. The adjustable magnetic clip component slides onto the back of a mobile microphone of the CB radio. The adjustable magnetic clip component comprises an arm component with a ball and nut that is adjustable and an attached magnet component. Accordingly, the ball and nut allow the attached magnet component to be positioned in a desired location. Thus, when the device is used on a mobile microphone, it can be easily hung up on any suitable metal base.

Radio microphones have traditionally been attached to their mounting device in a vehicle using a clip assembly. The clip assembly is a two-prong clip that utilizes a tongue and groove attachment to secure the microphone to the clip assembly mount. As such, when the radio user wants to remove or replace a radio microphone from the traditional clip assembly mount, they might find it difficult to locate the precise positioning required to attach the radio microphone to its mount. This normally requires them to either waste time trying to remove or replace the microphone several times or causes them to take their eyes away from the road to concentrate on removing or replacing the microphone rather than concentrate on their driving.

In one embodiment, an illustrative clip assembly mount is shown for coupling with a conventional radio handset microphone of the type typically used in public transportation vehicles, trucks, and emergency vehicles, such as police cars. The radio handset microphone includes a body receiving internal electrical components, such as a microphone and a speaker (not shown) and supporting an external mechanical hang-up clip or protrusion. The hang-up clip may be of conventional design as to include a knob or protrusion on the rear of the microphone which secures to the two-prong clip assembly mount.

In one embodiment, the magnetic mic mount device comprises an adjustable magnetic clip component that will hook to a CB radio microphone. The adjustable magnetic clip component comprises a base having a two-prong clip component configured to engage the knob or protrusion on the rear of the microphone, securing the device to the microphone.

In one embodiment, the base comprises an arm component which extends from the base to engage a magnet component. The arm component can be any suitable length, as long as it allows the magnet component to protrude from the base. The arm component can be any suitable shape and size as is known in the art but is typically a cylindrical shaped component.

In one embodiment, the arm component is then secured to a ball of a ball and socket joint. The ball is typically secured to the arm component and the socket is secured to a bottom of the magnet component. The ball and socket joint are configured to engage and allow the magnet component to move in relation to the arm component. Thus, a user can position the magnet component in any suitable position during use.

In one embodiment, the ball and socket joint includes a locking nut that locks down the magnet component. Once the user positions the magnet component in a specific position, the nut is then utilized to lock the magnet component in position, during use. Specifically, the nut is threaded onto the socket portion of the ball and socket joint to secure the magnet component in place. Once in place, the magnet component is then utilized to secure the microphone to the CB radio or other suitable metallic surface as is known in the art. Thus, the microphone can then be easily hung on the metal base of a CB radio or other metallic surface, without distracting the user from driving.

In one embodiment, the body of the CB radio is formed of a magnetically attractive material (such as a metal) and is configured to be supported by an interior surface of a vehicle. More particularly, a fastener, such as mounting screws extending through openings in the body may be used to couple the CB radio to the interior surface of the vehicle. Furthermore, the device allows the microphone to be mounted to any suitable mounting surface, including vehicle dashboards and center consoles, as well as an outside surface of the radio, desk, other work surface, or wall. Generally, the CB radio or other mounting surface includes materials such as steel, iron, ferrous metal, nickel, and cobalt. Optionally, the mounting surface may be carbon steel with a black oxide finish to prevent corrosion. In one embodiment, a coating for the mounting surface may also be electrically conductive to promote grounding of the microphone.

In one embodiment, the magnet component is a disc shaped component, but can be any suitable shape as is known in the art. The magnet component may be formed of a conventional material composition, such as ferrite or neodymium, and other alloys of rare earth elements. As further detailed herein, the magnet component is configured to releasably couple with the body of the CB radio, or another magnetically attractive member, via a magnetic force.

In one embodiment, the magnet component may be axially polarized. An axially polarized magnet may provide a broader and more consistent placement of the microphone on the CB radio or mounting surface. As a result, an axially polarized magnet may be more useful when the user must connect the microphone to the CB radio or mounting surface based on feel and without looking at either object. In this manner, the user may attach the microphone by bringing the microphone in the general vicinity of the CB radio or mounting surface.

In one embodiment, the sizes of the magnet component may provide a desired pull force to remove the microphone from the CB radio or mounting surface. Optionally, the pull force may be between approximately 5-30 pounds, and further optionally approximately 10-15 pounds. Optionally, the magnet component may have a diameter between approximately 0.5 inches and 2.00 inches, and further optionally approximately 1.75 inch. Optionally, the magnet component may have a thickness of approximately 0.1 inches to 0.4 inches, and further optionally approximately 0.375 inches.

In one embodiment, the magnet component comprises a shield or cover coupled to the magnet component. More particularly, the shield is formed of a metal and covers at least a portion of the external surface of the magnet component. The shield is configured to protect the magnet component from the environment, such as moisture and/or debris. In other embodiments, the shield may be eliminated. In such embodiments, the magnet component may be protected by a coating or covering, for example, a polymeric coating. In another embodiment, the magnet component includes an outer vinyl layer. The outer vinyl layer acts as a cushion or shock absorber that allows the user to hang up the radio microphone without fear of cracking or breaking the magnet component.

The magnetic mic mount device converts the conventional hang-up clip of a microphone from a mechanical connection to a magnetic connection. More particularly, the magnet component of the device is magnetically attracted to a magnetically attractive member, such as the CB radio, thereby releasably coupling the radio handset microphone to an interior surface of the vehicle without requiring the user to align the clip assembly with a conventional two-prong mount. The magnetic connection facilitates simple coupling and uncoupling of the microphone with the CB radio or another magnetically attractive member.

Thus, the user can quickly and efficiently mount the radio microphone after use without taking his/her eyes off the road, or otherwise diverting his/her attention from driving, to accurately place the microphone in the traditional clip assembly. Furthermore, the user will be able to easily remove the microphone from its mounted location for use by merely pulling on the microphone with enough strength to separate the magnet component from the CB radio.

In yet another embodiment, the magnetic mic mount device comprises a plurality of indicia.

In yet another embodiment, a method of securing a microphone for a CB radio to a metallic surface is disclosed. The method includes the steps of providing a magnetic mic mount device comprising an adjustable magnetic clip component with a short arm component with a plastic ball and nut and attached magnet component. The method also comprises securing the adjustable magnetic clip component to the back of the microphone. Further, the method comprises adjusting the attached magnet component in a desired position. Finally, the method comprises securing the microphone via the magnet component to the CB radio.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
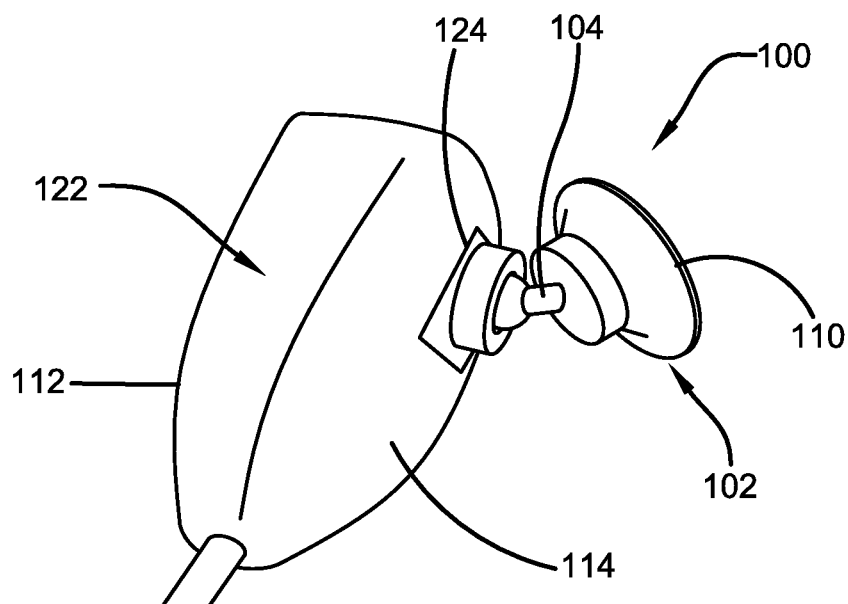
FIG. 1 illustrates a perspective view of one embodiment of the magnetic mic mount device of the present invention showing the device applied to a microphone for a CB radio in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a magnetic mic mount device that provides users with a magnetic microphone mount for a CB radio. There is also a long-felt need in the art for a magnetic mic mount device that features an adjustable and flexible design for ease of use and access to the microphone. Further, there is a long-felt need in the art for a magnetic mic mount device that allows drivers to stay focused on the road when returning and picking up a CB radio microphone to its holder. Moreover, there is a long-felt need in the art for a device that enhances safety by reducing distracted driving. Further, there is a long-felt need in the art for a magnetic mic mount device that accommodates truck drivers, public transportation workers, emergency personnel, and anyone who uses a CB radio while traveling. Finally, there is a long-felt need in the art for a magnetic mic mount device that can be secured to any suitable metal base.

The present invention, in one exemplary embodiment, is a novel magnetic mic mount device. The device is a magnetic mount for a CB radio microphone. The magnetic mic mount device comprises an adjustable magnetic clip component that will hook to a CB radio microphone. Once the user has hooked the device to his or her microphone, the user may hang it up on his or her CB radio. The adjustable magnetic clip component comprises a short arm component with a plastic ball and nut that is adjustable and attached magnet component. Accordingly, the plastic ball and nut allow the attached magnet component to be positioned in a desired location. The present invention also includes a novel method of securing a microphone for a CB radio to a metallic surface. The method includes the steps of providing a magnetic mic mount device comprising an adjustable magnetic clip component with a short arm component with a plastic ball and nut and attached magnet component. The method also comprises securing the adjustable magnetic clip component to the back of the microphone. Further, the method comprises adjusting the attached magnet component in a desired position. Finally, the method comprises securing the microphone via the magnet component to the CB radio.

Referring initially to the drawings, FIG. 1 illustrates a perspective view of one embodiment of the magnetic mic mount device 100 of the present invention. In the present embodiment, the magnetic mic mount device 100 is an improved magnetic mic mount device 100 that provides a user with a magnetic mount for a CB radio microphone 112. Specifically, the magnetic mic mount device 100 comprises an adjustable magnetic clip component 102 that will hook to a CB radio microphone 112. The adjustable magnetic clip component 102 slides onto the back 114 of a mobile microphone 112 of the CB radio 116. The adjustable magnetic clip component 102 comprises an arm component 104 with a ball 106 and nut 108 that is adjustable and an attached magnet component 110. Accordingly, the ball 106 and nut 108 allow the attached magnet component 110 to be positioned in a desired location. Thus, when the device 100 is used on a mobile microphone 112, it can be easily hung up on any suitable metal base 118.

Radio microphones 112 have traditionally been attached to their mounting device (or CB radio 116) in a vehicle using a clip assembly 120. The clip assembly 120 is a two-prong clip that utilizes a tongue and groove attachment to secure the microphone 112 to the clip assembly mount 120. As such, when the radio user wants to remove or replace a radio microphone 112 from the traditional clip assembly mount 120, they might find it difficult to locate the precise positioning required to attach the radio microphone 112 to its mount 120. This normally requires them to either waste time trying to remove or replace the microphone 112 several times or causes them to take their eyes away from the road to concentrate on removing or replacing the microphone 112, rather than concentrate on their driving.

Furthermore, an illustrative clip assembly mount 120 is shown for coupling with a conventional radio handset microphone 112 of the type typically used in public transportation vehicles, trucks, and emergency vehicles, such as police cars. The radio handset microphone 112 includes a body 122 receiving internal electrical components, such as a microphone and a speaker (not shown) and supporting an external mechanical hang-up clip or protrusion 124. The hang-up clip 124 may be of conventional design to include a knob or protrusion 124 on the rear 114 of the microphone 112 which secures to the two-prong clip assembly mount 120.

Figure 2:
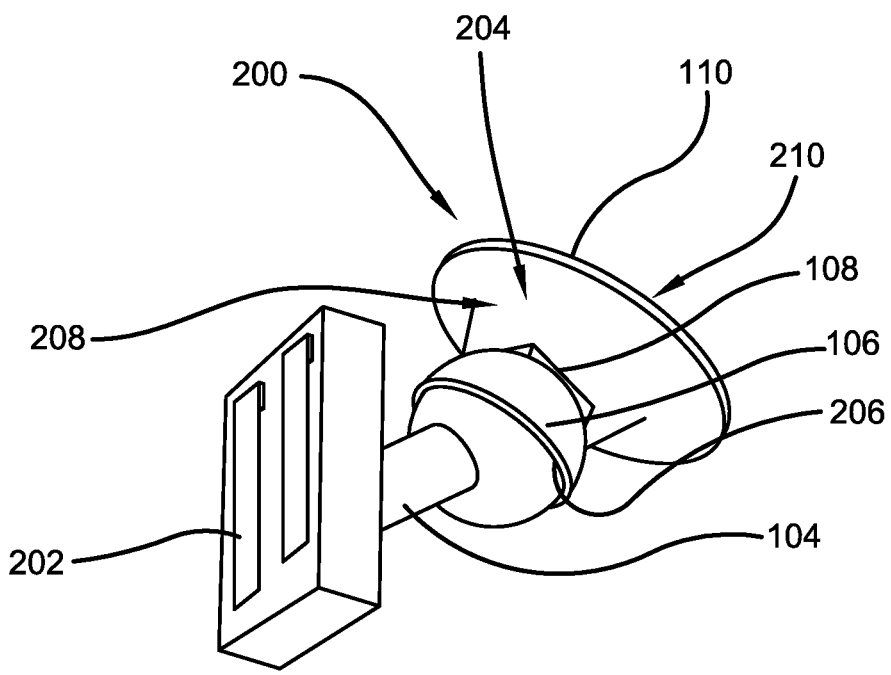
FIG. 2 illustrates a perspective view of one embodiment of the magnetic mic mount device of the present invention in accordance with the disclosed architecture.

As shown in FIG. 2, the magnetic mic mount device 100 comprises an adjustable magnetic clip component 102 that will hook to a CB radio microphone 112. The adjustable magnetic clip component 102 comprises a base 200 having a two-prong clip component 202 configured to engage the knob or protrusion 124 on the rear 114 of the microphone 112, securing the device 100 to the microphone 112. The base 200 can be any suitable shape and size as is known in the art, as long as it's sized to retain an adequate-sized magnet component. Further, the two-prong clip component 202 can be any suitable securing component that allows the device 100 to be secured to the microphone 112 during use.

Furthermore, the base 200 comprises an arm component 104 which extends from the base 200 to engage a magnet component 110. The arm component 104 can be any suitable length, as long as it allows the magnet component 110 to protrude from the base 200. The arm component 104 can be any suitable shape and size as is known in the art but is typically a cylindrical shaped component. The arm component 104 can be secured to the base 200 via any suitable securing means as is known in the art, such as adhesives, pins, screws, etc.

Generally, the arm component 104 is then secured to a ball 106 of a ball and socket joint 204. The ball 106 is typically secured to the arm component 104 and the socket 206 is secured to a bottom 208 of the magnet component 110. The ball and socket joint 204 are configured to engage and allow the magnet component 110 to move in relation to the arm component 104. Thus, a user can position the magnet component 110 in any suitable position during use.

In one embodiment, the ball and socket joint 204 includes a nut or a locking nut 108 that locks down the magnet component 110. Once the user positions the magnet component 110 in a specific position, the nut 108 is then utilized to lock the magnet component 110 in position, during use. Specifically, the nut 108 is threaded onto the socket portion 206 of the ball and socket joint 204 to secure the magnet component 110 in place. Once in place, the magnet component 110 is then utilized to secure the microphone 112 to the CB radio 116 or other suitable metallic surface 118 as is known in the art. Thus, the microphone 112 can then be easily hung on the metal base 118 of a CB radio 116 or other metallic surface 118, without distracting the user from driving.

Generally, the magnet component 110 is a disc shaped component, but can be any suitable shape as is known in the art. The magnet component 110 may be formed of a conventional material composition, such as ferrite or neodymium, and other alloys of rare earth elements. As further detailed herein, the magnet component 110 is configured to releasably couple with the body of the CB radio 116, or another magnetically attractive member, via a magnetic force.

In one embodiment, the magnet component 110 may be axially polarized. An axially polarized magnet may provide a broader and more consistent placement of the microphone 112 on the CB radio 116 or mounting surface 118. As a result, an axially polarized magnet may be more useful when the user must connect the microphone 112 to the CB radio 116 or mounting surface 118 based on feel and without looking at either object. In this manner, the user may attach the microphone 112 by bringing the microphone 112 in the general vicinity of the CB radio 116 or mounting surface 118.

Further, the sizes of the magnet component 110 may provide a desired pull force to remove the microphone 112 from the CB radio 116 or mounting surface 118. Optionally, the pull force may be between approximately 5-30 pounds, and further optionally approximately 10-15 pounds. Optionally, the magnet component 110 may have a diameter between approximately 0.5 inches and 1.5 inches, and further optionally approximately 1.0 inch. Optionally, the magnet component 110 may have a thickness of approximately 0.1 inches to 0.4 inches, and further optionally approximately 0.25 inches.

In one embodiment, the magnet component 110 comprises a shield or cover 210 coupled to the magnet component 110. More particularly, the shield 210 is formed of a metal and covers at least a portion of the external surface of the magnet component 110. The shield 210 is configured to protect the magnet component 110 from the environment, such as moisture and/or debris. In other embodiments, the shield 210 may be eliminated. In such embodiments, the magnet component 110 may be protected by a coating or covering, for example, a polymeric coating. In another embodiment, the magnet component 110 includes an outer vinyl layer. The outer vinyl layer acts as a cushion or shock absorber that allows the user to hang up the radio microphone 112 without fear of cracking or breaking the magnet component 110.

Figure 3:
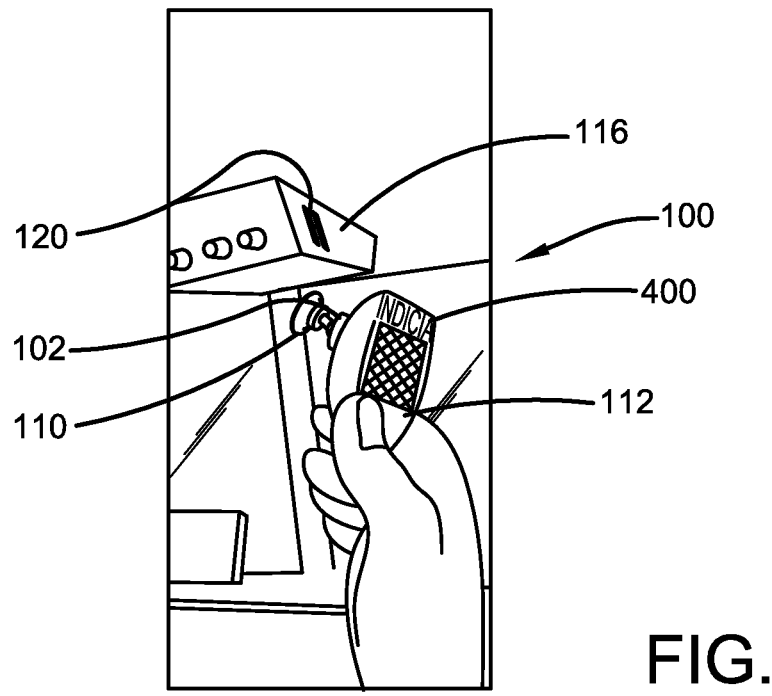
FIG. 3 illustrates a perspective view of one embodiment of the magnetic mic mount device of the present invention showing the device being secured to the CB radio in accordance with the disclosed architecture.
Figure 4:
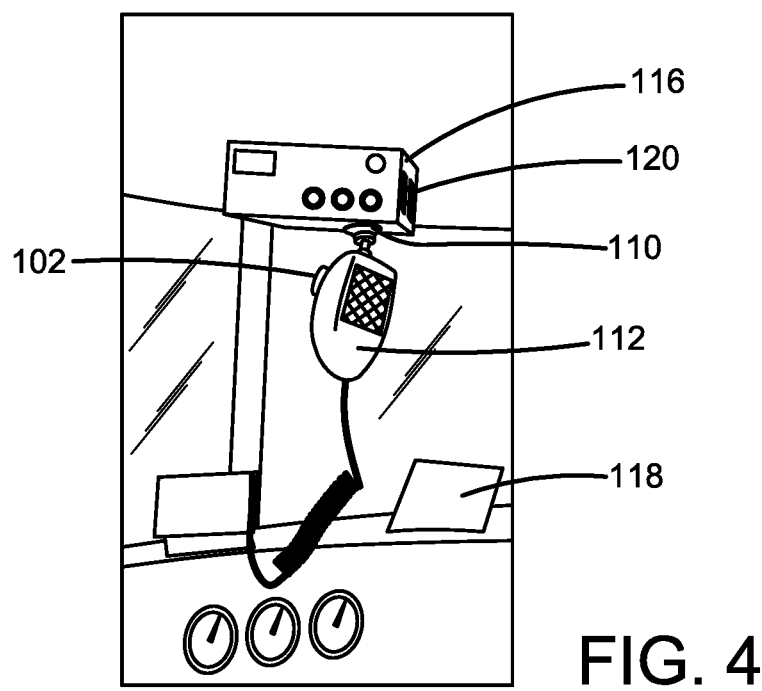
FIG. 4 illustrates a perspective view of one embodiment of the magnetic mic mount device of the present invention showing the device in use in accordance with the disclosed architecture.

As shown in FIGS. 3-4, the body of the CB radio 116 is formed of a magnetically attractive material (such as a metal) and is configured to be supported by an interior surface of a vehicle. More particularly, a fastener, such as mounting screws, extending through openings in the body may be used to couple the CB radio 116 to the interior surface of the vehicle. Furthermore, the device 100 allows the microphone 112 to be mounted to any suitable mounting surface, including vehicle dashboards and center consoles, as well as an outside surface of the radio 116, desk, other work surface, or a wall. Generally, the CB radio 116 or other mounting surface 118 includes materials such as steel, iron, nickel, and cobalt. Optionally, the mounting surface 118 may be carbon steel with a black oxide finish to prevent corrosion. In one embodiment, a coating for the mounting surface 118 may also be electrically conductive to promote grounding of the microphone 112.

Further, the magnetic mic mount device 100 converts the conventional hang-up clip 124 of a microphone 112 from a mechanical connection to a magnetic connection. More particularly, the magnet component 110 of the device 100 is magnetically attracted to a magnetically attractive member, such as the CB radio 116, thereby releasably coupling the radio handset microphone 112 to an interior surface of the vehicle without requiring the user to align the protrusion or hang-up clip 124 with a conventional two-prong clip assembly 120. The magnetic connection facilitates simple coupling and uncoupling of the microphone 112 with the CB radio 116 or another magnetically attractive member.

Thus, the user can quickly and efficiently mount the radio microphone 112 after use without taking his/her eyes off the road, or otherwise diverting his/her attention from driving, to accurately place the microphone 112 in the traditional clip assembly 120. Furthermore, the user will be able to easily remove the microphone 112 from its mounted location for use by merely pulling on the microphone 112 with enough strength to separate the magnet component 110 from the CB radio 116.

In yet another embodiment, the magnetic mic mount device 100 comprises a plurality of indicia 400. The base 200 of the device 100 may include advertising, trademark, other letters, designs, or characters, printed, painted, stamped, or integrated into the base 200, or any other indicia 400 as is known in the art. Specifically, any suitable indicia 400 as is known in the art can be included, such as, but not limited to, patterns, logos, emblems, images, symbols, designs, letters, words, characters, animals, advertisements, brands, etc., that may or may not be radio, microphone, or brand related.

Figure 5:
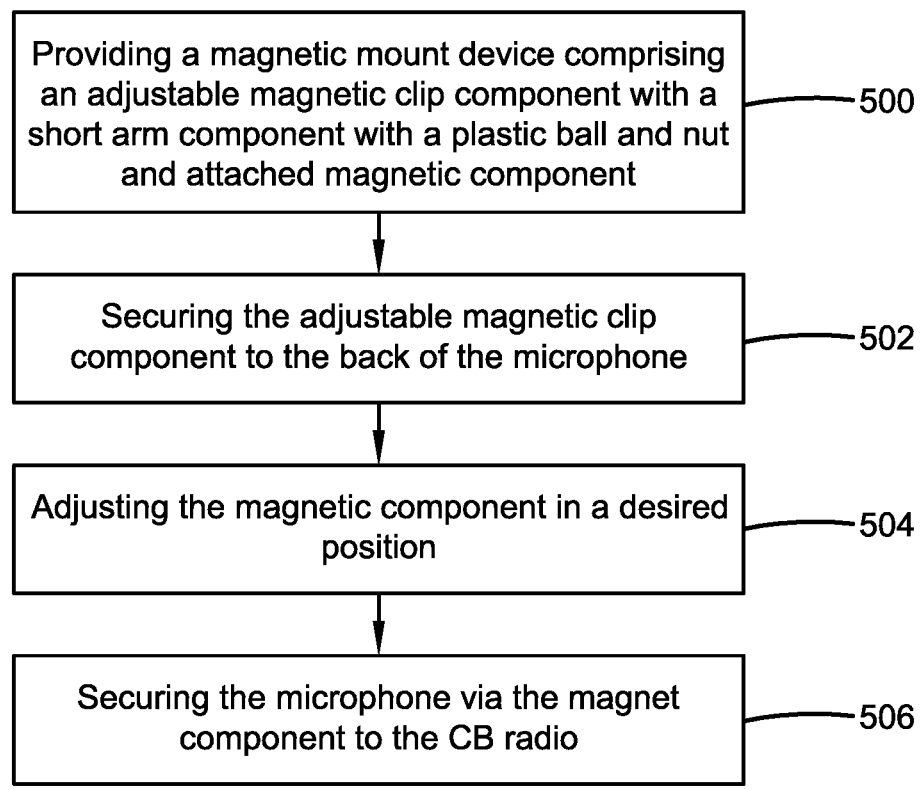
FIG. 5 illustrates a flowchart showing the method of securing a microphone for a CB radio to a metallic surface in accordance with the disclosed architecture.

FIG. 5 illustrates a flowchart of the method of securing a microphone for a CB radio to a metallic surface. The method includes the steps of at 500, providing a magnetic mic mount device comprising an adjustable magnetic clip component with a short arm component with a plastic ball and nut and attached magnet component. The method also comprises at 502, securing the adjustable magnetic clip component to the back of the microphone. Further, the method comprises at 504, adjusting the attached magnet component in a desired position. Finally, the method comprises at 506, securing the microphone via the magnet component to the CB radio.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "magnetic mic mount device", "magnetic device", "mic device", and "device" are interchangeable and refer to the magnetic mic mount device 100 of the present invention.

Notwithstanding the foregoing, the magnetic mic mount device 100 of the present invention can be of any suitable size and configuration as is known in the art without affecting the overall concept of the invention, provided that it accomplishes the above-stated objectives. One of ordinary skill in the art will appreciate that the magnetic mic mount device 100 as shown in FIGS. 1-5 are for illustrative purposes only, and that many other sizes and shapes of the magnetic mic mount device 100 are well within the scope of the present disclosure. Although the dimensions of the magnetic mic mount device 100 are important design parameters for user convenience, the magnetic mic mount device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A magnetic mic mount device that provides a user with a magnetic mount for a CB radio microphone, the magnetic mic mount device comprising:
   an adjustable magnetic clip component comprising a base with an arm component and an attached magnet component;
   wherein the adjustable magnetic clip component secures to a back of a microphone of a CB radio; and
   further wherein the adjustable magnetic clip component allows the microphone to be magnetically secured to the CB radio.

2. The magnetic mic mount device of claim 1, wherein the adjustable magnetic clip component comprises a base having a two-prong clip component configured to engage a knob on a rear of the microphone, securing the magnetic mic mount device to the microphone.

3. The magnetic mic mount device of claim 2, wherein the arm component extends from the base to engage the attached magnet component.

4. The magnetic mic mount device of claim 3, wherein the arm component is then secured to a ball of a ball and socket joint.

5. The magnetic mic mount device of claim 4, wherein the socket of the ball and socket joint is secured to a bottom of the attached magnet component.

6. The magnetic mic mount device of claim 5, wherein the ball and socket joint is configured to engage and allow the attached magnet component to move in relation to the arm component.

7. The magnetic mic mount device of claim 6, wherein a user can position the attached magnet component in multiple positions via the ball and socket joint.

8. The magnetic mic mount device of claim 7, wherein the ball and socket joint includes a locking nut that locks down the attached magnet component, once the attached magnet component is in a specific position.

9. The magnetic mic mount device of claim 8, wherein the locking nut is threaded onto the socket of the ball and socket joint to secure the attached magnet component in place.

10. The magnetic mic mount device of claim 9, wherein the attached magnet component is a disc shaped component.

11. The magnetic mic mount device of claim 10, wherein the attached magnet component comprises a shield or outside layer coupled to the attached magnet component to protect the attached magnet component.

12. The magnetic mic mount device of claim 11, wherein the adjustable magnetic clip component is secured to a CB radio.

13. The magnetic mic mount device of claim 11, wherein the adjustable magnetic clip component is secured to a metal base.

14. A magnetic mic mount device that provides a user with a magnetic mount for a CB radio microphone, the magnetic mic mount device comprising:
   an adjustable magnetic clip component comprising a base with an arm component and an attached magnet component; and
   wherein the adjustable magnetic clip component comprises a base having a two-prong clip component configured to engage a knob on a rear of a microphone, securing the magnetic mic mount device to the microphone;

wherein the arm component extends from the base to engage the attached magnet component;

wherein the arm component is then secured to a ball of a ball and socket joint;

wherein the socket of the ball and socket joint is secured to a bottom of the attached magnet component;

wherein the ball and socket joint is configured to engage and allow the attached magnet component to move in relation to the arm component;

wherein the ball and socket joint includes a locking nut that locks down the attached magnet component, once the attached magnet component is in a specific position;

wherein the locking nut is threaded onto the socket of the ball and socket joint to secure the attached magnet component in place; and further wherein the adjustable magnetic clip component allows the microphone to be magnetically secured to a CB radio, without requiring a user to align the knob with a conventional two-prong clip assembly.

15. The magnetic mic mount device of claim 14 further comprising a plurality of indicia.

16. The magnetic mic mount device of claim 14, wherein the attached magnet component is a disc shaped component.

17. The magnetic mic mount device of claim 14, wherein the attached magnet component comprises a shield or outside layer coupled to the attached magnet component to protect the attached magnet component.

18. The magnetic mic mount device of claim 14, wherein a user can position the attached magnet component in multiple positions via the ball and socket joint.

19. The magnetic mic mount device of claim 14, wherein the adjustable magnetic clip component allows the microphone to be magnetically secured to a metal base.

20. A method of securing a microphone for a CB radio to a metallic surface, the method comprising the following steps:

providing a magnetic mic mount device comprising an adjustable magnetic clip component with a short arm component with a plastic ball and nut and attached magnet component;

securing the adjustable magnetic clip component to the back of the microphone;

adjusting the attached magnet component in a desired position; and securing the microphone via the magnet component to the CB radio.

\* \* \* \* \*